(12) United States Patent
Scicluna et al.

(10) Patent No.: US 7,307,836 B2
(45) Date of Patent: Dec. 11, 2007

(54) DATA STORAGE DEVICE CARRIER AND CHASSIS

(75) Inventors: Mark Scicluna, Long Sutton (GB); Paul Alan Bushby, Lancing (GB); Adam Wade, Rowlands Castle (GB)

(73) Assignee: Xyratex Technology Limited, Hampshire (GB)

( * ) Notice: Subject to any disclaimer, the term of this patent is extended or adjusted under 35 U.S.C. 154(b) by 320 days.

(21) Appl. No.: 11/076,136

(22) Filed: Mar. 10, 2005

(65) Prior Publication Data

US 2005/0201053 A1    Sep. 15, 2005

Related U.S. Application Data

(60) Provisional application No. 60/552,744, filed on Mar. 15, 2004.

(51) Int. Cl.
G06F 1/16 (2006.01)
(52) U.S. Cl. ........................ 361/685; 340/635
(58) Field of Classification Search ................ 361/685; 340/635
See application file for complete search history.

(56) References Cited

U.S. PATENT DOCUMENTS

| | | | |
|---|---|---|---|
| 5,634,080 A | 5/1997 | Kikinis et al. | |
| 5,734,549 A | 3/1998 | Oura | |
| 5,777,264 A * | 7/1998 | Chen | 174/51 |
| 6,064,569 A * | 5/2000 | Sands et al. | 361/685 |
| 6,231,224 B1 * | 5/2001 | Gamble et al. | 362/551 |
| 6,373,696 B1 * | 4/2002 | Bolognia et al. | 361/687 |
| 6,431,718 B1 * | 8/2002 | Gamble et al. | 362/85 |
| 6,483,107 B1 | 11/2002 | Rabinovitz et al. | |
| 6,490,153 B1 | 12/2002 | Casebolt et al. | |
| 6,603,657 B2 * | 8/2003 | Tanzer et al. | 361/685 |
| 6,608,750 B2 * | 8/2003 | Cruz et al. | 361/685 |
| 6,661,651 B1 * | 12/2003 | Tanzer et al. | 361/685 |
| 6,826,056 B2 * | 11/2004 | Tsuyuki et al. | 361/725 |
| 6,867,701 B2 * | 3/2005 | Lawrence et al. | 340/635 |
| 6,876,547 B2 * | 4/2005 | McAlister | 361/685 |
| 6,906,918 B2 * | 6/2005 | Rabinovitz | 361/687 |
| 6,970,352 B2 * | 11/2005 | Record et al. | 361/685 |

(Continued)

FOREIGN PATENT DOCUMENTS

EP    1 322 043 A2    6/2003

*Primary Examiner*—Lisa Lea-Edmonds
(74) *Attorney, Agent, or Firm*—Pillsbury Winthrop Shaw Pittman LLP (57) ABSTRACT

In one aspect, a data storage device carrier (10) has a bay in which a data storage device can be received. A light pipe (11) is provided for conveying light from one end of the carrier (10) to the other. A diffuser (16) is located near to but spaced from said other end of the light pipe (11) so as to spread and thereby magnify light emerging from said other end of the light pipe (11). In another aspect, a data storage device chassis (1) has a plurality of walls (3,4,20). At least some of the walls (3,4,20) have at least one runner (21) along at least part of the length of the wall (3,4,20) to define a plurality of bays in which data storage devices can be housed. At least one runner (21) has a transparent portion so as to be able to convey light from a light source (9) to the front of the chassis (1). In another aspect, a data storage device carrier (10 or chassis (1) has a strip of electroluminescent material (31) for displaying information.

12 Claims, 6 Drawing Sheets

U.S. PATENT DOCUMENTS 7,012,815 B2 * 3/2006 Garnett et al. .............. 361/825
2002/0162034 A1 10/2002 Dimitri et al.
2003/0222550 A1 12/2003 Boswell et al.

* cited by examiner

DATA STORAGE DEVICE CARRIER AND CHASSIS

CROSS REFERENCE TO RELATED APPLICATION

This application claims the benefit of priority to U.S. application Ser. No. 60/552,744, filed Mar. 15, 2004, the content of which is hereby incorporated by reference.

The present invention relates to a data storage device carrier and to a data storage device chassis.

As is well known, data storage devices, such as disk drive units, are used to store data. In many applications, plural data storage device are mounted in carriers that are housed in a single chassis and which are removable therefrom for maintenance or replacement of the data storage devices as and when necessary. In practice, it is desirable to fit as many data storage devices in a single chassis as possible in order to save space. A typical known chassis of standard 19" (approx. 48 cm) rack width and height of 3U (5¼", approx. 13 cm) may hold 12 or 15 data storage devices at most, the devices being arranged in a regular array. A more recent chassis, which can hold 16 data storage devices, is disclosed in our US-A-2003/0222550, the entire content of which is hereby incorporated by reference. In each case,. the data storage devices are hard disk drives each having a hard disk having a standard nominal diameter of 3.5" (approx. 9 cm).

More recently, hard disk drives having a hard disk with a standard nominal diameter of 2.5" (approx. 6 cm) have become widely available and have been used in laptop computers and the like. There is a growing desire to use plural 2.5" hard disk drives housed in a single chassis, to replace the 3.5" hard disk drives which have historically been used. Inevitably, there is a desire to fit as many of the 2.5" hard disk drives in a chassis of standard width and height as possible.

A number of difficulties arise in the design of a chassis of this type, particularly when trying to accommodate a greater number of data storage devices in their carriers in a standard volume because space is at a premium.

For example, in a chassis of this type, there is provided a so-called backplane which conventionally extends laterally across the chassis at a point between the front and rear ends. The backplane provides electrical connections to which the disk drives are in use connected for power and data supply. The backplane moreover contains light sources, such as LEDs, in order to provide status information on the state of the drives and the power supply, etc. It is not possible for example to put these light sources on the front of the disk drives themselves as the disk drives themselves do not have sufficient "intelligence" to drive the LEDs appropriately and there are insufficient connections on the standard backplane to allow for such additional light sources. Given that the light sources are mounted on the backplane which in use is behind the disk drives, it is necessary to convey light from the light sources past the disk drives to the front of the chassis. Conventionally, this has been done by relatively large diameter light pipes, which pass through channels in the disk drive carriers and/or in large spaces in the chassis body between or below the disk drives. The light pipes are typically specially formed plastics material and are similar to optical fibres. An example of such an arrangement is disclosed in U.S. Pat. No. 6,483,107, in which a relatively thick light pipe is mounted in a wall of a disk drive carrier. It is to be noted that a lens is used in conjunction with the light pipe of this prior art in order to mix the light being transmitted along the light pipe from a blue LED and a red LED thereby to produce purple light. However, where space is at a premium, it is not possible to fit these large diameter light pipes in the very thin carrier walls which will be used, and there is simply no space elsewhere in the chassis for the light pipes to pass in accordance with the known arrangements.

Accordingly, it is necessary to find new ways of providing illumination for operator and similar displays at the front of the chassis.

According to a first aspect of the present invention, there is provided a carrier for a data storage device, the carrier having a first end and a second end and comprising: a bay in which a data storage device can be received; at least one light pipe for conveying light from the second end of the carrier to the first end of the carrier, the at least one light pipe having a first end near the first end of the carrier and a second end near the second end of the carrier; and, a diffuser near to but spaced from the first end of the at least one light pipe so as to spread and thereby magnify light emerging from the first end of the at least one light pipe.

In this aspect, the use of the diffuser means that a narrow diameter light pipe can be used compared to the relatively large diameter light pipes used in the known arrangements. If a narrow diameter light pipe were used, then the viewing angle of light emitted from the end of the light pipe would be very narrow, which is highly undesirable. The diffuser spreads and therefore magnifies the emitted light, thus giving a wide and therefore much more useful viewing angle. The diffuser is preferably a translucent but not transparent material. It should be noted that the term "light pipe" is used differently in the art and is sometimes restricted in meaning to fibre optic-type arrangements. However, in the present specification, unless the context requires otherwise, the term "light pipe" is to be construed broadly to encompass anything that can fulfil the function of adequately conveying light from one region to another to provide illumination.

The major cross-sectional dimension of the light pipe is preferably equal to or less than about 0.7 mm.

The carrier may comprise a wall extending between the first and second ends in which the at least one light pipe is at least partially received. The at least one light pipe is preferably received wholly within said wall.

The carrier may comprise a step against which the first end of the light pipe abuts to determine the spacing between the first end of the light pipe and the diffuser.

In a preferred embodiment, the diffuser is a film having a textured surface. The surface may have a "frosted" effect, which enhances the light-spreading qualities of the diffuser.

The carrier may comprise plural light pipes for conveying light from the second end of the carrier to the first end of the carrier, each of the light pipes having a first end near the first end of the carrier and a second end near the second end of the carrier. In one embodiment, there is a single diffuser near to but spaced from the first end of each of the light pipes so as to spread light emerging from the first end of each of the light pipes. In an alternative, there are plural diffusers near to but spaced from the first end of respective ones of the light pipes so as to spread light emerging from the first end of each of the light pipes. For example, there could be one diffuser for each light pipe, or some light pipes might share a diffuser, depending on the particular arrangement.

According to a second aspect of the present invention, there is provided a data storage device chassis for housing a plurality of data storage devices, the chassis comprising: a first end at which data storage devices can be inserted in and removed from the chassis; a backplane having at least one light source; and, a plurality of walls; at least some of the walls having at least one runner along at least part of the length of the wall to define a plurality of bays in which data storage devices can be housed, said runners in use supporting respective data storage devices in the bays such that said data storage devices can be slid into and out of the bays by sliding along the runners, at least one runner having a transparent portion that extends from the backplane to the first end of the chassis so as to be able to convey light from the light source to the first end of the chassis.

In this aspect, use is made of the runners, which are conventionally present in a data storage device chassis, to save space by making the runners perform the dual role of providing support for the disk drives and carrying of light.

In a preferred embodiment, said at least one runner is wholly transparent, which saves the most space as no additional space at all is required for any item that merely conveys light. In another embodiment, said transparent portion is provided by at least one light pipe which is received within said at least one runner. This alternative may not always be available, depending on the thickness required of the runner and the thickness of the light pipe.

The chassis may comprise plural light sources on the backplane and plural runners having transparent portions that extend from the backplane to the first end of the chassis so as to be able to convey light from the light sources to the first end of the chassis.

According to a third aspect of the present invention, there is provided a carrier for a data storage device, the carrier having a first end and a second end and comprising: a bay in which a data storage device can be received; a strip of electroluminescent material across the first end of the carrier for displaying information; and, an electrical conductor for conducting electrical power from the second end of the carrier to the electroluminescent material across the first end of the carrier.

In this aspect, electroluminescent material is provided on the carrier itself in order to provide the light source. Electroluminescent material is known per se and glows or illuminates on application of a sufficient driving current. This avoids the need to convey light from some position in the carrier to the front of the carrier (although this may still be used in addition to the strip of electroluminescent material).

In a preferred embodiment, the electrical conductor is provided by a continuation of the strip of electroluminescent material along a side of the carrier to the second end of the carrier. The electroluminescent material can be extremely thin, less than say 0.25 mm, and thus takes up barely any space within the chassis in which the carrier is in use mounted.

Alternatively or additionally, the electrical conductor may be provided by one or more electrically conducting wires that pass from the second end of the carrier to the electroluminescent material across the first end of the carrier.

The strip of electroluminescent material may have a thickness equal to or less than about 1 mm.

According to another aspect of the present invention, there is provided a data storage device chassis for housing one or more data storage devices, the chassis comprising: a first end at which a data storage device can be inserted in and removed from the chassis; a backplane; the first end having a strip of electroluminescent material for displaying information; and, an electrical conductor for conducting electrical power from the backplane to the electroluminescent material at the first end of the chassis.

In this aspect, again it is not necessary to convey light from some position in the carrier to the front of the carrier (although this may still be used in addition to the strip of electroluminescent material). The electrical conductor may be provided by a continuation of the strip of electroluminescent material along a side of the chassis to the backplane. Alternatively or additionally, the electrical conductor may be provided by one or more electrically conducting wires that pass from the backplane to the electroluminescent material at the first end of the chassis.

The strip of electroluminescent material may have a thickness equal to or less than about 1 mm.

Embodiments of the present invention will now be described by way of example with reference to the accompanying drawings, in which:

FIG. 2 is a partially exploded, schematic perspective view of an example of a carrier according to an embodiment of the present invention, with FIG. 2A being an enlarged view of a portion of the carrier;

FIG. 3 is a schematic cross-sectional view through a light pipe and diffuser of the carrier of FIG. 2;

FIG. 4 is a schematic perspective view of a dividing wall of a chassis being connected to a backplane;

FIG. 5 is a cross-sectional view on A-A of FIG. 4, with FIG. 5A being an enlarged view of a portion of FIG. 5;

Figure 1:
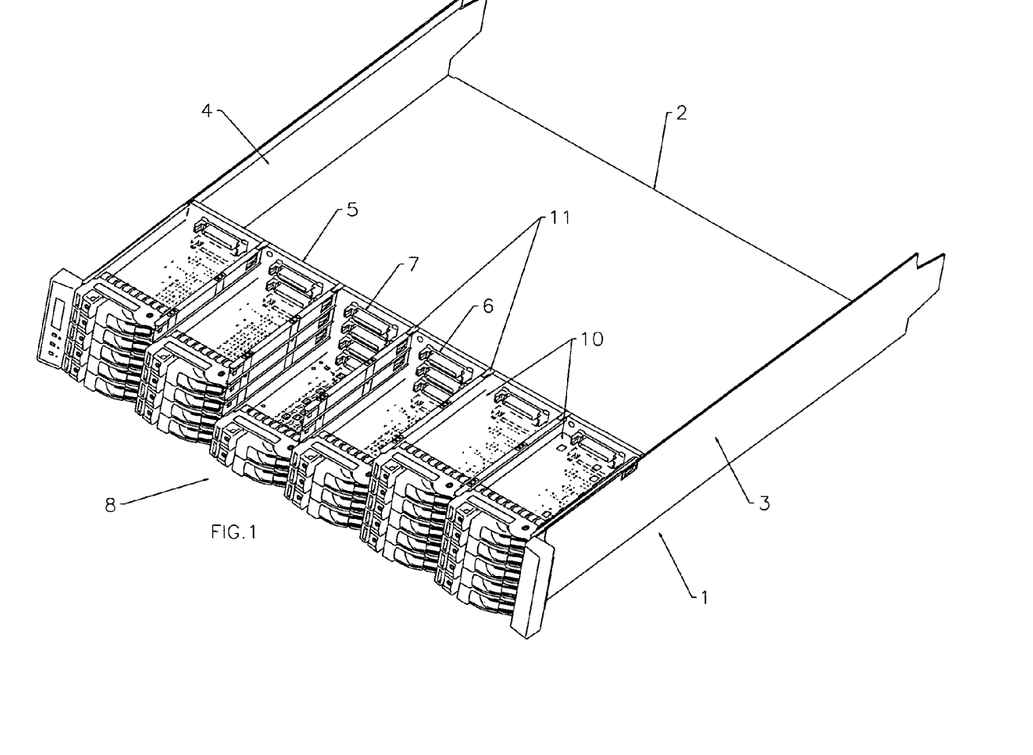
FIG. 1 shows schematically a perspective view of a data storage device chassis with the top removed in order to show plural disk drive carriers and a backplane.

Referring first to FIG. 1, there is shown a portion of a data storage device chassis 1 having a base 2 and side walls 3,4. In this example, the data storage devices are disk drive units. The top of the chassis 1 is omitted from FIG. 1 for clarity. The chassis 1 has a backplane 5 which generally divides the chassis 1 into a front portion, where the disk drives and carriers are located, and a rear portion, where electronics and power supplies and the like are located. The backplane 5 provides electrical and data connections 6,7 for disk drives mounted in use in the chassis 1.

In the first or front end 8 of the chassis 1 there are mounted plural disk drive carriers 10. Again for reasons of clarity, the disk drives themselves are not shown in FIG. 1. In this example, thirty carriers 10 are arranged in six columns of five carriers 10 each to fit in the standard 19 inch rack size having a height of 2U. The carriers 10 can be inserted into and removed from the front end 8 of the chassis 1. The carriers 10 may be made of any suitable material. For example, injection moulded plastics, such as polycarbonate, may be used. Alternatively, a metal may be used, including for example aluminium or zinc, and the metal may be die cast.

Figures 2, 2A, 3:
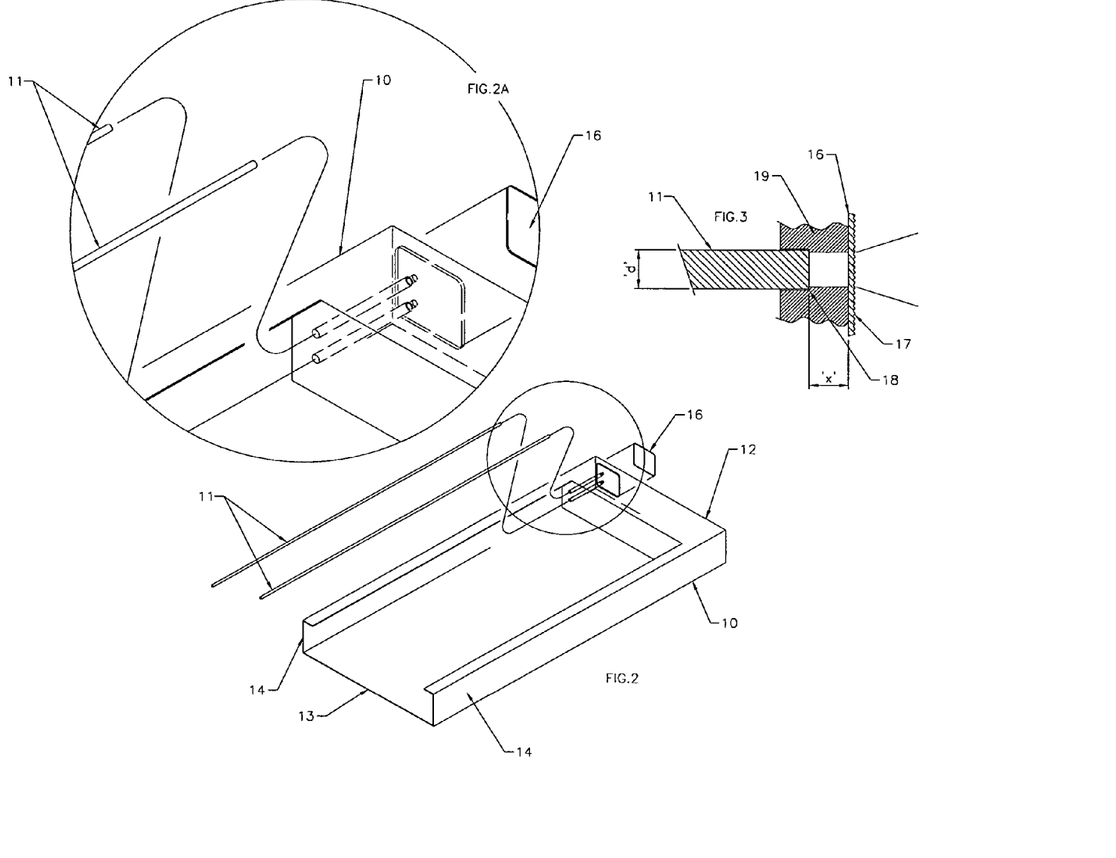

Referring now to FIGS. 2 and 3, in one aspect the carrier 10 has one or more light pipes 11 (two being shown in the example) which run from the first or front end 12 of the carrier 10 to the second or rear end 13 of the carrier 10. In the example shown, the light pipes 11 are embedded partially or wholly within one of the side walls 14 of the carrier 10. The side walls 14 define in part a bay of the carrier 10 in which a data storage device is received in use. In FIGS. 2 and 2A, the front ends of the light pipes 11 are shown projecting beyond the end of the carrier 10 because other components, such as a locking and release handle 15 (shown in FIG. 1) are omitted from FIGS. 2 and 2A. The light pipes 11 of this embodiment are of narrow diameter d compared to the light pipes conventionally used in such chassis. For example, conventionally the light pipes have a diameter (for circular cross-sectional light pipes) or other major dimension (for square, rectangular or other cross-sectional shapes) of 1.5 mm or 3 mm or greater. On the other hand, in the preferred embodiment, the light pipes 11 have a diameter or, in the case of non-circular cross-sections, a major cross-sectional dimension d equal to or less than 0.7 mm and most preferably 0.5 mm or thereabouts. However, a smaller diameter or major dimension may be used, such as 0.3 mm or even 0.25 mm or less.

The effect of this narrow diameter d for the light pipes 11 can be seen in FIG. 3. In particular, the light emerging immediately from the front of the light pipe 11 has a narrow angle of divergence and therefore there would normally be only a narrow natural viewing angle from the end of the light pipe. This is inconvenient and indeed risky, given that the light pipes are used to display warning signals to an operator and therefore it is important that an operator has a wide viewing angle.

In this embodiment, this problem is solved by providing a diffuser 16 near to but spaced a distance x from the front ends of the light pipes 11. In one example, x may be in the range 1 to 10 mm, with 4 mm being one preferred specific example size. Whilst many different arrangements for the diffuser 16 to achieve the desired purpose are possible, in the preferred embodiment the diffuser 16 has a textured surface 17 on the side facing away from the light pipe. In an example, this can be achieved by giving the diffuser 16 a "frosted" surface 17. In any event, the diffuser 16 is preferably translucent but not transparent so that it has a diffusing effect. The effect of this, as can be seen in FIG. 3, is to magnify the light beam and thus increase the viewing angle of the light emitted from the diffuser 16.

To help fix the spacing x at the preferred value, a step 18 is provided internally of each of the through holes in the end wall 19 of the carrier 10 through which the light pipes 11 pass. The light pipes 11 are cut to be over-length so that when installed, the light pipes 11 butt up against the step 18. Any slack in the light pipes 11 is accommodated along the length of the side wall 14. The diffuser 16 is fixed to the outside face of the end wall 19 of the carrier 10. It will be seen that the distance from the outside face of the end wall 19 to the step 18 is x, the desired spacing from the ends of the light pipes 11 to the diffuser 16. It will also be understood that the step 18 or similar structure may be provided in another component such as an insert (not shown) which may be pressed into or otherwise fitted to the carrier 10. This alternative makes it easier to provide a carrier 10 having a different spacing x simply by using a different insert.

Accordingly, in this aspect, light pipes of very narrow diameter can be used without compromising the viewing angle of light emitted at the front of the carriers 10. The narrow diameter light pipes 11 take up barely any space within the chassis 1 and/or carriers 10.

Figures 4, 5, 5A:
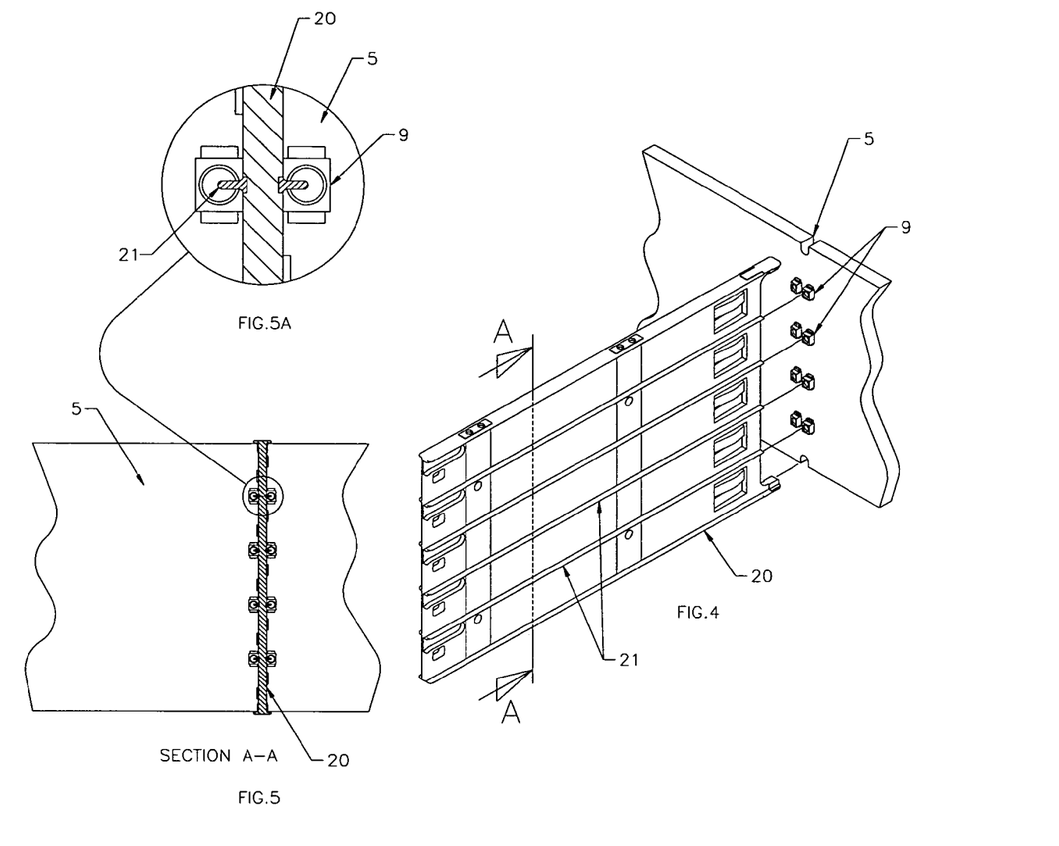

Referring now to FIGS. 4 and 5, an alternative arrangement for conveying light is shown. In these drawings, there is shown a portion of the backplane 5 on which plural light sources 9, such as LEDs, are mounted. One of the dividing walls 20 of the chassis 1 is shown. It will be appreciated that the following discussion of the runners can apply equally to the runners provided on the main side walls 3,4 of the chassis 1.

As is known per se, plural runners 21 project from either side of the wall 20 in order to define the bays in which the carriers 10 are received and to provide guide strips on which the carriers 10 slide when the carriers 10 are inserted into and removed from the chassis 1. In this example, at least one and preferably plural runners 21 have a transparent portion that extends along the length of the wall 20 so as to run from the backplane 5 to the front 8 of the chassis 1. If space permits, this transparent portion can be achieved by embedding one or more light pipes, which may be of narrow or relatively large diameter, either partially or wholly within a runner 21. However, owing to the space constraints, in the preferred embodiment the entirety of the runner 21 is made to be transparent. This can be achieved relatively easily through known plastics moulding techniques, for example. In any event, the transparent portion of the runners 21 convey light from the light sources 9 to the front of the chassis 1 where the status, etc. information can be viewed by an operator.

Figure 6:
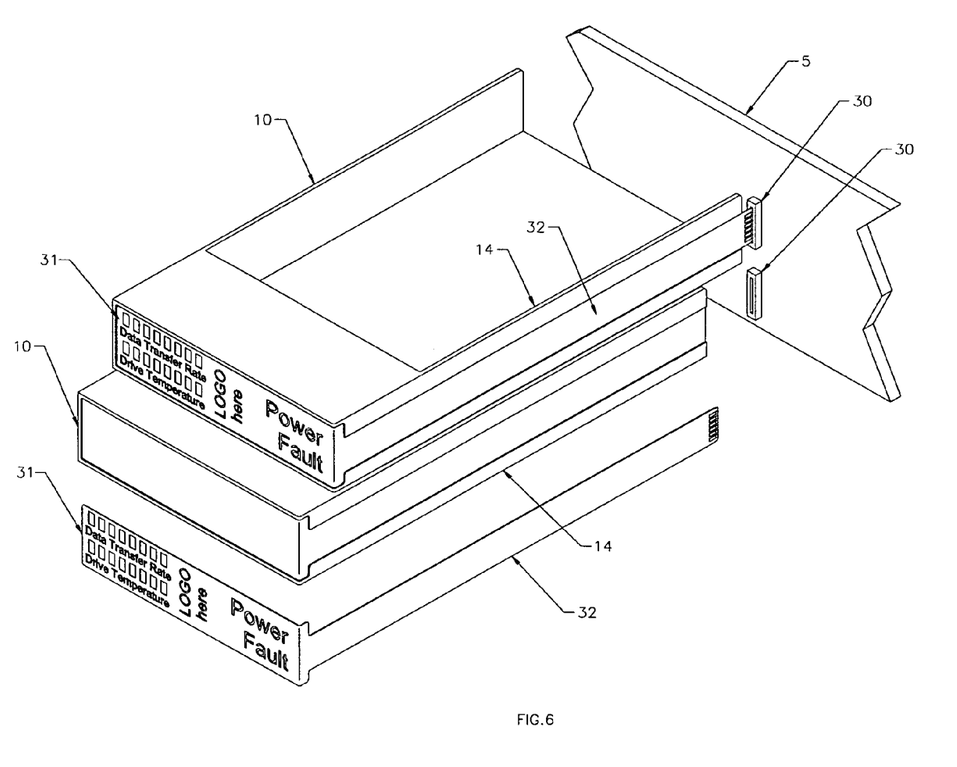
FIG. 6 is a schematic perspective view of an example of two carriers in accordance with another embodiment of the present invention being fixed to a backplane; and, FIG. 7 is a schematic perspective view of another example of a chassis in accordance with an embodiment of the present invention, with FIG. 7A being an enlarged view or a portion of the chassis.

Referring now to FIG. 6, there is shown another example of a carrier 10. In FIG. 6, two carriers 10 are shown being connected to a backplane 5. In this example, the backplane 5 does not contain any light sources. Instead, the backplane 5 has an electrical connector 30 that provides a power supply for a strip of electroluminescent material 31 which is fixed to the front of the carrier 10. Electroluminescent materials per se are known and glow or illuminate when driven by an electric current. In the example shown in FIG. 6, the electrical power is supplied from the backplane connector 30 to the label 31 at the front of the carrier 10 by an extension 32 of the label 31 which runs down one side 14 of the carrier 10. Accordingly, in this example, the electroluminescent material 31,32 provides both the light source and the arrangement for conducting electrical power from the backplane 5 to the front of the carrier 10. Alternatively, if for example space permits, the side strip 32 of the electroluminescent material may be replaced by thin electrical wires. As another example, instead of wires, a flexible printed circuit could be used to convey power to the display portion 31 of the electroluminescent material.

This arrangement has a number of advantages. The electroluminescent material can be very thin, typically less than about 1 mm, though typically more than about 0.1 mm, and preferably of the order of 0.25 mm, and therefore takes up barely any space. The display portion 31 of the electroluminescent material can be large and can therefore be used to provide much more information than has previously been available at the front of the carrier 10. For example, more information about the status of the disk drive, the drive temperature, the data transfer rate, and the status of the power supply generally can be provided. Previously, providing this amount of information would have required many LEDs on the backplane 5 and correspondingly many light pipes to convey light, which compromised the space available for the important components such as the disk drives themselves. The use of the electroluminescent material on the display portion 31 also allows promotional material, such as the name or logo of the manufacturer, to be provided in illuminated form at the front of the carrier 10.

It should be noted that whilst the electroluminescent material can entirely replace the need for LEDs and light pipes, in some circumstances it may be desirable additionally to retain one or more LEDs or other light sources on the backplane 5 and use light pipes, or transparent runners as described above, to convey the light to the front of the carrier 10.

Figure 7:
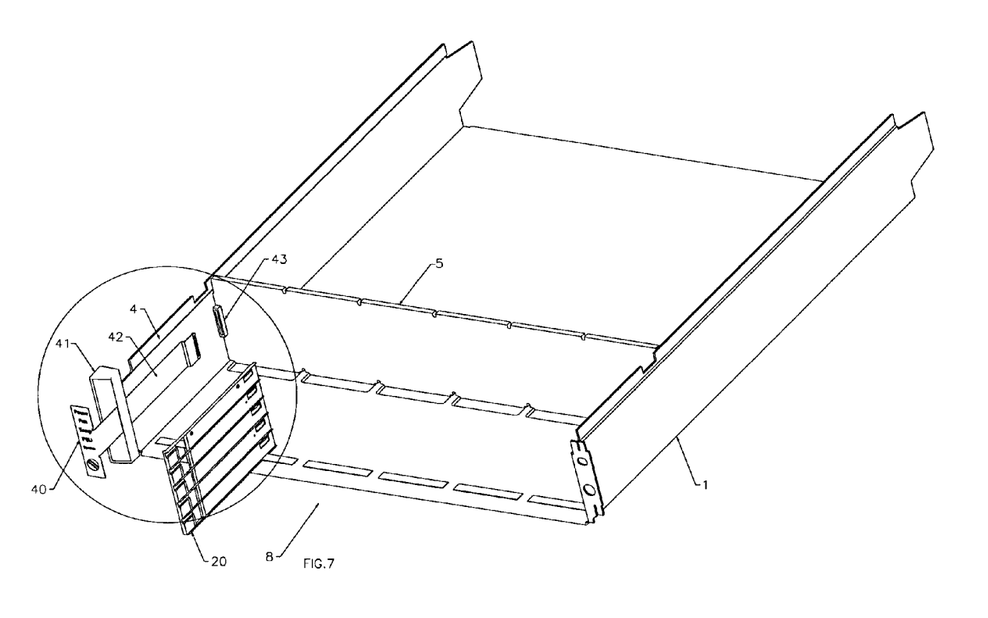
Figure 7A:
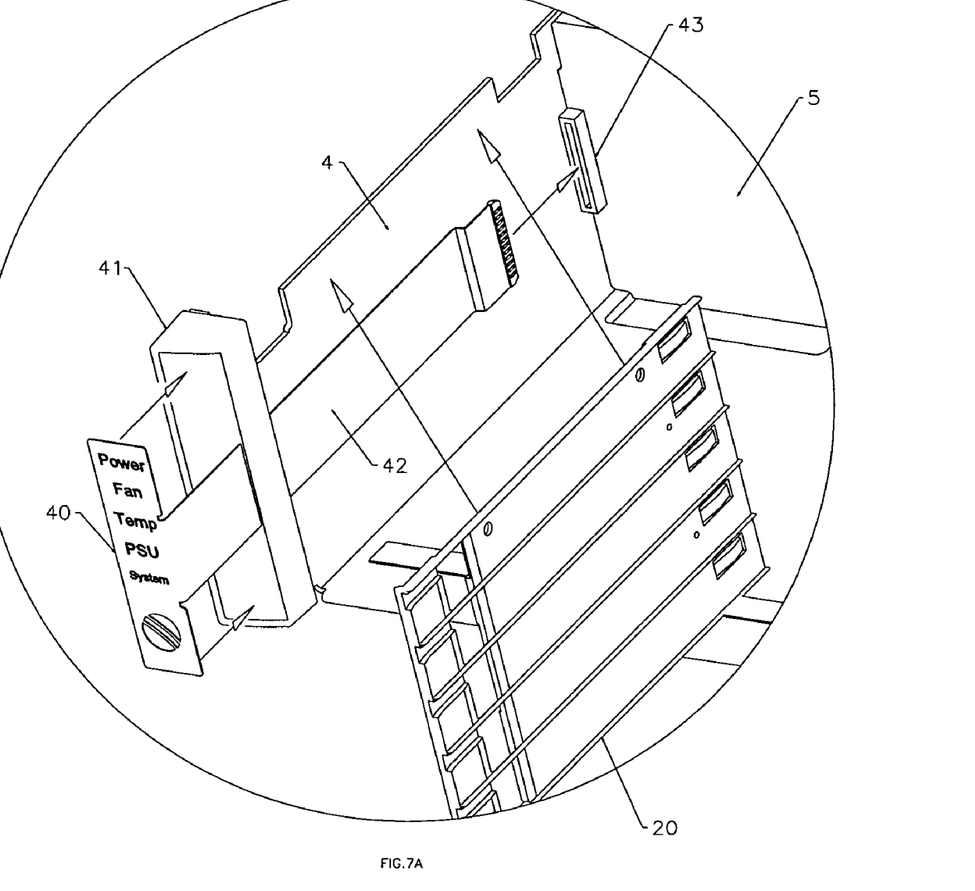

Referring now to FIG. 7, there is shown another arrangement for providing status and other information at the front of the chassis 1. In this arrangement, a strip 40 of electroluminescent material is affixed to a suitable portion 41 at the front 8 of the chassis 1. In this example, the electroluminescent material 40 is positioned on a small planar front portion 41 of one of the side walls 4 of the chassis 1. In this example, the electroluminescent material has a side portion 42 which passes down the side wall 4 of the chassis 1 and mates with a connector 43 on the backplane 5. As with the examples described above, this side portion 42 of the electroluminescent material is for conveying electrical power to the display portion 40. As an alternative, electrical wires and/or a flexible printed circuit could be used instead to convey electrical power to the display portion 40. In any event, this arrangement maximises the space in the chassis 1 that is available for the disk drives and their carriers 10. Again, the electroluminescent material can be very thin, typically less than about 1 mm, though typically more than about 0.1 mm, and preferably of the order of 0.25 mm, and therefore takes up barely any space. Furthermore, the display portion 40 can display much more information than was possible previously where for example only a small number of light sources, such as LEDs, have conventionally been positioned at the front of the chassis 1 or on the backplane 5 with light pipes conveying light to the front of the chassis 1.

Embodiments of the present invention have been described with particular reference to the example illustrated. However, it will be appreciated that variations and modifications may be made to the examples described within the scope of the present invention.

The invention claimed is:

1. A data storage device chassis for housing a plurality of data storage devices, the chassis comprising:
   a first end at which data storage devices can be inserted in and removed from the chassis;
   a backplane having at least one light source; and,
   a plurality of walls;
   at least some of the walls having at least one runner along at least part of the length of the wall to define a plurality of bays in which data storage devices can be housed, said runners in use supporting respective storage devices in the bays such that said data storage devices can be slid into and out of the bays by sliding along the runners, at least one runner having a solid transparent portion that extends from the backplane to the first end of the chassis so as to be able to convey light from the light source to the first end of the chassis.

2. A chassis according to claim 1, wherein said at least one runner is wholly transparent.

3. A data storage device chassis for housing a plurality of data storage devices, the chassis comprising:
   a first end at which data storage devices can be inserted in and removed from the chassis;
   a backplane having at least one light source; and,
   a plurality of walls;
   at least some of the walls having at least one runner along at least part of the length of the wall to define a plurality of bays in which data storage devices can be housed, said runners in use supporting respective data storage devices in the bays such that said data storage devices can be slid into and out of the bays by sliding along the runners, at least one runner having a transparent portion that extends from the backplane to the first end of the chassis so as to be able to convey light from the light source to the first end of the chassis, wherein said transparent portion is provided by at least one light pipe which is received within said at least one runner.

4. A data storage device chassis for housing a plurality of data storage devices, the chassis comprising:
   a first end at which data storage devices can be inserted in and removed from the chassis;
   a backplane having at least one light source; and,
   a plurality of walls;
   at least some of the walls having at least one runner along at least part of the length of the wall to define a plurality of bays in which data storage devices can be housed, said runners in use supporting respective data storage devices in the bays such that said data storage devices can be slid into and out of the bays by sliding along the runners, at least one runner having a transparent portion that extends from the backplane to the first end of the chassis so as to be able to convey light from the light source to the first end of the chassis the chassis comprising plural light sources on the backplane and plural runners having transparent portions that extend from the backplane to the first end of the chassis so as to be able to convey light from the light sources to the first end of the chassis.

5. A carrier for a data storage device, the carrier having a first end and a second end and comprising:
   a bay in which a data storage device can be received;
   a strip of electroluminescent material across the first end of the carrier for displaying information; and,
   an electrical conductor for conducting electrical power from the second end of the carrier to the electroluminescent material across the first end of the carrier.

6. A carrier according to claim 5, wherein the electrical conductor is provided by a continuation of the strip of electroluminescent material along a side of the carrier to the second end of the carrier.

7. A carrier according to claim 5, wherein the electrical conductor is provided by one or more electrically conducting wires that pass from the second end of the carrier to the electroluminescent material across the first end of the carrier.

8. A carrier according to claim 5, wherein the strip of electroluminescent material has a thickness equal to or less than about 1 mm.

9. A data storage device chassis for housing one or more data storage devices, the chassis comprising:
   a first end at which a data storage device can be inserted in and removed from the chassis;
   a backplane;
   the first end having a strip of electroluminescent material for displaying information; and,
   an electrical conductor for conducting electrical power from the backplane to the electroluminescent material at the first end of the chassis.

10. A chassis according to claim 9, wherein the electrical conductor is provided by a continuation of the strip of electroluminescent material along a side of the chassis to the backplane.

11. A chassis according to claim 9, wherein the electrical conductor is provided by one or more electrically conducting wires that pass from the backplane to the electroluminescent material at the first end of the chassis.

12. A chassis according to claim 9, wherein the strip of electroluminescent material has a thickness equal to or less than about 1 mm.

* * * * *